US008811307B2

United States Patent
Wu (10) Patent No.: US 8,811,307 B2
(45) Date of Patent: Aug. 19, 2014

(54) METHOD OF HANDLING LONG TERM EVALUATION POSITIONING PROTOCOL DATA AND RELATED COMMUNICATION DEVICE

(75) Inventor: Chih-Hsiang Wu, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 503 days.

(21) Appl. No.: 12/837,482

(22) Filed: Jul. 15, 2010

(65) Prior Publication Data

US 2011/0013589 A1    Jan. 20, 2011

Related U.S. Application Data

(60) Provisional application No. 61/226,287, filed on Jul. 17, 2009, provisional application No. 61/233,842, filed on Aug. 14, 2009.

(51) Int. Cl.
| | |
|---|---|
| *H04W 4/00* | (2009.01) |
| *H04W 36/00* | (2009.01) |
| *H04W 4/02* | (2009.01) |
| *H04W 72/10* | (2009.01) |
| *H04W 64/00* | (2009.01) |
| *H04W 84/04* | (2009.01) |

(52) U.S. Cl.
CPC ........... *H04W 36/0055* (2013.01); *H04W 4/02* (2013.01); *H04W 64/00* (2013.01); *H04W 72/10* (2013.01); *H04W 84/042* (2013.01)
USPC ........................................ 370/329; 455/456.1

(58) Field of Classification Search
None
See application file for complete search history.

(56) References Cited

U.S. PATENT DOCUMENTS

| | | | |
|---|---|---|---|
| 8,358,243 B2 * | 1/2013 | Lin et al. ................. | 342/357.42 |
| 2005/0182565 A1 | 8/2005 | Bourdeaut | |
| 2006/0099958 A1 | 5/2006 | Gustafsson | |
| 2007/0182547 A1 | 8/2007 | Wachter | |
| 2007/0243885 A1 | 10/2007 | Shim | |
| 2010/0041418 A1 * | 2/2010 | Edge et al. ................. | 455/456.2 |
| 2010/0232362 A1 * | 9/2010 | Tenny ........................ | 370/328 |
| 2011/0143771 A1 * | 6/2011 | Edge et al. ................. | 455/456.1 |

FOREIGN PATENT DOCUMENTS

| | | |
|---|---|---|
| CN | 101401470 A | 4/2009 |
| EP | 1 104 967 A2 | 6/2001 |
| EP | 1 170 919 A1 | 1/2002 |
| EP | 1 104 967 A3 | 10/2002 |
| EP | 1983698 A1 | 10/2008 |
| TW | 200908767 | 2/2009 |
| WO | 02058425 A2 | 7/2002 |
| WO | 2008133587 A1 | 11/2008 |
| WO | 2009021217 A1 | 2/2009 |

OTHER PUBLICATIONS

Office action mailed on Aug. 31, 2012 for the China application No. 201010233448.X, filing date Jul. 19, 2010, p. 1-6.

(Continued)

*Primary Examiner* — Marcus R Smith
(74) *Attorney, Agent, or Firm* — Winston Hsu; Scott Margo (57) ABSTRACT

A method of handling long term evaluation positioning protocol (LPP) data for a communication device in a wireless communication system is disclosed. The method comprises setting that a first message of a non-access stratum (NAS) layer has higher transmission priority than a second message of a long term evaluation positioning protocol (LPP) layer.

2 Claims, 7 Drawing Sheets

(56) References Cited

OTHER PUBLICATIONS

3GPP R2-094098 3rd Generation Partnership Project; Technical Specification Group Radio Access Network; Evolved Universal Terrestrial Radio Access (E-UTRA); Stage 2 functional specification of User Equipment (UE) positioning in E-UTRAN (Release 9), Jul. 2009.
3GPP TS 24.301 V8.2.1 3rd Generation Partnership Project; Technical Specification Group Core Network and Terminals; Non-Access-Stratum (NAS) protocol for Evolved Packet System (EPS); Stage 3 (Release 8), Jun. 2009.
3GPP TS 36.321 V8.6.0 3rd Generation Partnership Project; Technical Specification Group Radio Access Network; Evolved Universal Terrestrial Radio Access (E-UTRA) Medium Access Control (MAC) protocol specification (Release 8), Jun. 2009.
"3rd Generation Partnership Project; Technical Specification Group Services and System Aspects; Evaluation of LCS Control Plane Solutions for EPS (Release 9)", 3GPP TR 23.891 V.9.0.0 (Mar. 2009), pp. 1-63, XP007915384, 3GPP, France.
Ericsson: "LTE positioning protocol architecture", 3GPP TSG-RAN WG3 #64, R3-091165, May 4-8, 2009, pp. 1/3-3/3, XP050341534, San Francisco, US.
European patent application No. 10169711.8, European application filing date: Jul. 15, 2010, European Search Report mailing date: Jul. 6, 2011.
Office action mailed on Jul. 8, 2011 for the European application No. 10169711.8, filing date Jul. 15, 2010, cover pages+ p. 1-7.
3GPP TS 36.305 V1.0.0 (May 2009), 3rd Generation Partnership Project; Technical Specification Group Radio Access Network; Evolved Universal Terrestrial Radio Access (E-UTRA); Stage 2 functional specification of User Equipment (UE) positioning in E-UTRAN (Release 9), XP55000812, p. 1-60.
3GPP TS 25.301 v7.4.0, "3rd Generation Partnership Project; Technical Specification Group Radio Access Network; Radio Interface Protocol Architecture (Release 7)", (Mar. 2008), coverpage+ p. 10+0 p. 30-32.
3GPP TS 36.331 v8.2.0, "3rd Generation Partnership Project; Technical Specification Group Radio Access Network; Evolved Universal Terrestrial Radio Access (E-UTRA) Radio Resource Control (RRC); Protocol specification (Release 8)", (May 2008), coverpage+ p. 15.
Office action mailed on Mar. 11, 2013 for the Taiwan application No. 099123519, filed Jul. 16, 2010, p. 1-12.
Office action mailed on Jun. 5, 2013 for the China application No. 201010233448.X, filing date Jul. 19, 2010, p. 1-6.
Office action mailed on Sep. 23, 2013 for the U.S. Appl. No. 13/754,872, filed Jan. 30, 2013, p. 1-23.
Qualcomm Europe, "Need for indication of E-SMLC capabilities", 3GPP TSG-RAN WG2 #66bis, R2-093858, Jun. 29-Jul. 3, 2009, Los Angeles, CA, USA.
Office action mailed on Dec. 10, 2013 for the China application No. 201010233448.X, filed Jul. 19, 2010.

* cited by examiner

METHOD OF HANDLING LONG TERM EVALUATION POSITIONING PROTOCOL DATA AND RELATED COMMUNICATION DEVICE

CROSS REFERENCE TO RELATED APPLICATIONS

This application claims the benefit of U.S. Provisional Application No. 61/226,287, field on Jul. 17, 2009 and entitled "Methods for transmitting LPP message in wireless communications system" and U.S. Provisional Application No. 61/233,842, field on Aug. 14, 2009 and entitled "Methods for transmitting LPP PDU in wireless communications system" the contents of which are incorporated herein in their entirety.

BACKGROUND OF THE INVENTION

1. Field of the Invention

A method utilized in a wireless communication and related communication device are disclosed, and more particularly, to a method of handling long term evaluation positioning protocol data in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, a LTE Positioning Protocol (LPP) is set up between the UE and an evolved serving mobile location centre (E-SMLC) for determining the result of the positioning for the UE. The LPP is a point to point positioning protocol and supports positioning and location related services (e.g. transfer of assistance data) for the UE accessing E-UTRAN. To avoid creating new positioning protocols for future access types developed by 3GPP, and to enable positioning measurements for terrestrial access types other than E-UTRAN, LPP is in principle forward-compatible with other access types, even though restricted to E-UTRAN access.

According to the LTE specification for the LPP layer, several scenarios may occur and are described as follows.

In the first scenario, a non-access stratum (NAS) layer and the LPP layer are over a radio resource control (RRC) layer. Therefore, when a radio resource control (RRC) layer of the UE or the eNB has a LPP message and a NAS message to transmit, the LTE system does not clearly specify that RRC shall transmit the LPP message or the NAS message first. In other words, how to prioritize transmission of the LPP message and the NAS message is never concerned. If the NAS message (e.g. SERVICE REQUEST) transmission is delayed due to transmission of the LPP message, the call establishment (e.g. a mobile terminating call, a mobile originating call, or an emergency call) is delayed.

In the second scenario, the UE may transfer a LPP protocol data unit (PDU), to the E-SMLC via the eNB, whereas the E-SMLC may transfer the LPP PDU to the UE via the eNB. The UE or the eNB may not transmit LPP PDU successfully (e.g. interrupted by a handover or a RRC connection re-establishment due to a radio link failure). The LTE system does not clearly define how to deal with this situation, thereby causing LPP PDU loss.

In the third scenario, the network may release a NAS signaling connection with the UE. To allow the network to release the NAS signaling connection, the UE starts the timer T3440. When the timer T3440 expires, the UE releases NAS signaling connection and a RRC connection. If the UE transmit the LPP PDU during a running period of the timer T3440, the LPP PDU transmission may be failed due to T3440 expiry (i.e. RRC connection release).

SUMMARY OF THE INVENTION

A method of handling location service in a wireless communication system is disclosed to solve the abovementioned problems.

A method of handling long term evaluation positioning protocol data for a communication device in a wireless communication system is disclosed. The method comprises setting that a first message of a non-access stratum layer has higher transmission priority than a second message of a long term evaluation positioning protocol layer.

A method of handling long term evaluation positioning protocol data for a mobile device in a wireless communication system is disclosed. The method comprises initiating a transmission for transmitting a protocol data unit of a long term evaluation positioning protocol layer of the mobile device, to a first base station of the wireless communication system, and retransmitting the LPP PDU to the first base station or a second base station when the transmission is failed.

A method of handling long term evaluation positioning protocol data for a network, e.g. an eNode B or a Mobility Management Entity (MME) in a wireless communication system is disclosed. The method comprises receiving a protocol data unit of a long term evaluation positioning protocol layer of an evolved serving mobile location centre of the wireless communication system, initiating a transmission for transmitting the LPP PDU to a mobile device of the wireless communication system, and indicating that the LPP PDU transmission is failed to the E-SMLC when the transmission is failed.

A method of handling long term evaluation positioning protocol data for a network in a wireless communication system is disclosed. The method comprises initiating a transmission for transmitting a protocol data unit of a long term evaluation positioning protocol layer to a mobile device of the wireless communication system via a first base station of the wireless communication system when a re-establishment of the communication layer lower than the LPP layer, a handover, or a radio resource control connection re-establishment occurs, and retransmitting the LPP PDU to the mobile device via a second base station when the transmission is failed, wherein the mobile device connects to the second base station after the mobile device performs the handover, or the RRC connection re-establishment successfully.

A communication device of a wireless communication system for handling long term evaluation positioning protocol (LPP) data is disclosed. The communication device comprises means for generating a first message of a non-access stratum (NAS) layer of the communication device and a second message of a long term evaluation positioning protocol (LPP) layer of the communication device, and means for setting that the first message of the NAS layer has higher transmission priority than the second message of the LPP layer.

A mobile device of a wireless communication system for handling long term evaluation positioning protocol (LPP) data is disclosed. The mobile device comprises means for initiating a transmission for transmitting a protocol data unit (PDU) of a long term evaluation positioning protocol (LPP) layer of the mobile device, to a base station of the wireless communication system, and means for retransmitting the LPP PDU to the base station when the transmission is failed.

A base station of a wireless communication system for handling long term evaluation positioning protocol (LPP) data is disclosed. The base station comprises means for receiving a protocol data unit (PDU) of a long term evaluation positioning protocol (LPP) layer of an evolved serving mobile location centre (E-SMLC) of the wireless communication system, means for initiating a transmission for transmitting the LPP PDU to a mobile device of the wireless communication system, and means for indicating that the LPP PDU transmission is failed to the E-SMLC when the transmission is failed.

An evolved serving mobile location centre (E-SMLC) of a wireless communication system for handling long term evaluation positioning protocol (LPP) data is disclosed. The E-SMLC comprises means for initiating a transmission for transmitting a protocol data unit (PDU) of a long term evaluation positioning protocol (LPP) layer to a mobile device of the wireless communication system via a first base station of the wireless communication system when a re-establishment of the communication layer lower than the LPP layer, a handover, or a radio resource control (RRC) connection re-establishment occurs, and means for retransmitting the LPP PDU to the mobile device via a second base station when the transmission is failed, wherein the mobile device connects to the second base station after the mobile device performs the handover, or the RRC connection re-establishment successfully.

These and other objectives of the present disclosure will no doubt become obvious to those of ordinary skill in the art after reading the following detailed description of the preferred examples that are illustrated in the various figures and drawings.

DETAILED DESCRIPTION

Figure 1:
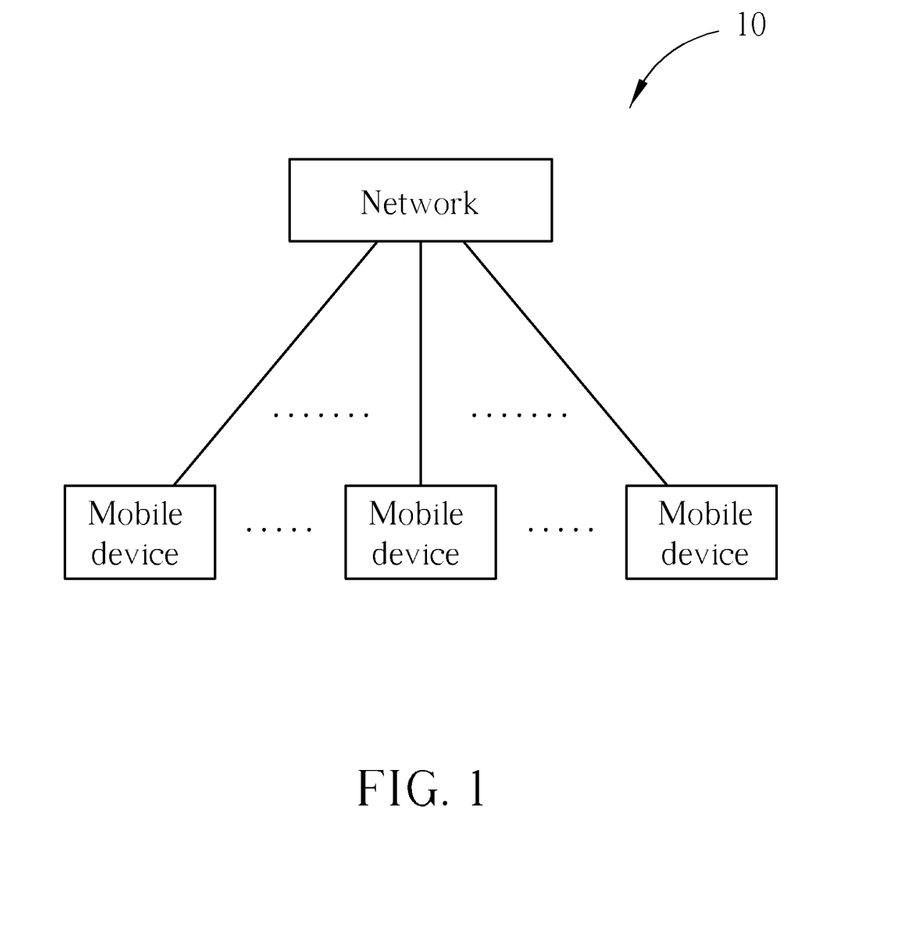
FIG. 1 illustrates a schematic diagram of an exemplary wireless communication system.

Please refer to FIG. 1, which illustrates a schematic diagram of a wireless communication system 10 according to an example. Briefly, the wireless communication system 10 is composed of a network and a plurality of mobile devices. The wireless communication system 10 can be an LTE (long-term evolution) system, LTE-Advanced system or any other similar network system. In the LTE system, the network can be referred as a EUTRAN (evolved-UTRAN) comprising a plurality of eNBs (e.g. base stations) or a core network entity (e.g. Mobility Management Entity called MME), whereas the mobile devices are referred as to user equipments (UEs). The UEs can be devices such as mobile phones, computer systems, etc. This terminology will be used throughout the application for ease of reference. However, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
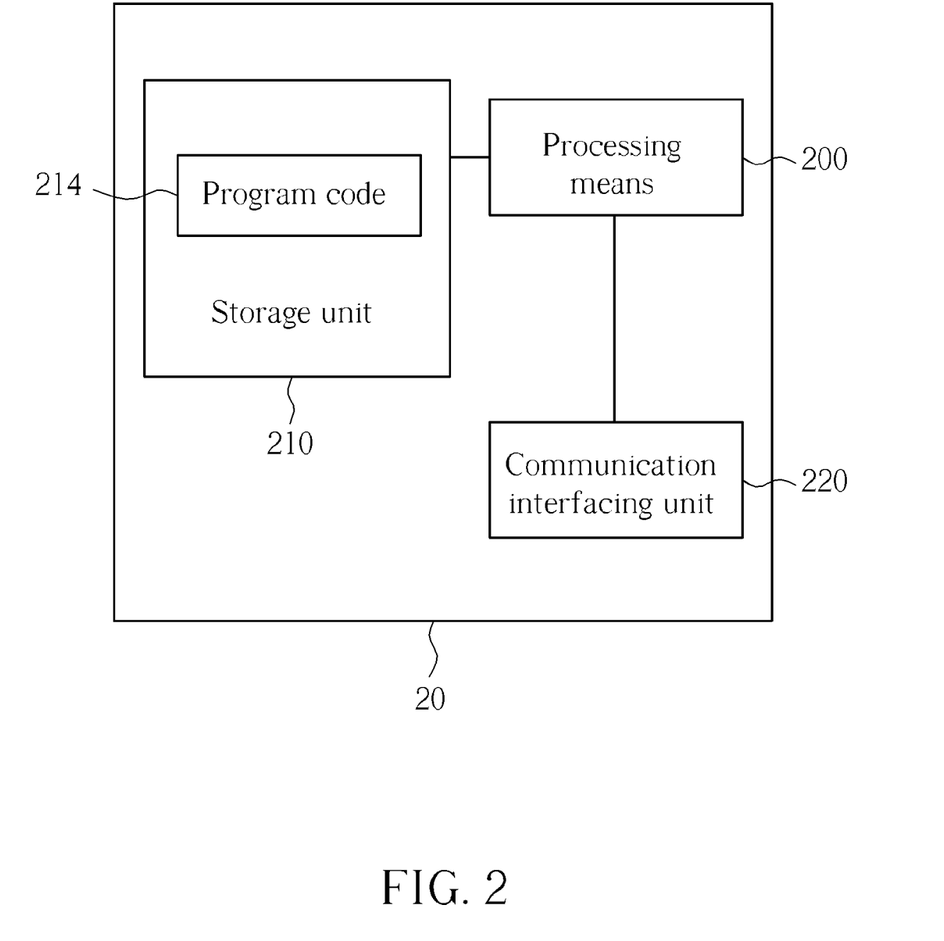
FIG. 2 illustrates a schematic diagram of an exemplary communication device.

FIG. 2 illustrates a schematic diagram of an exemplary communication device 20. The communication device 20 can be the mobile device or the network (e.g. a base station or an evolved serving mobile location centre (E-SMLC)) shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
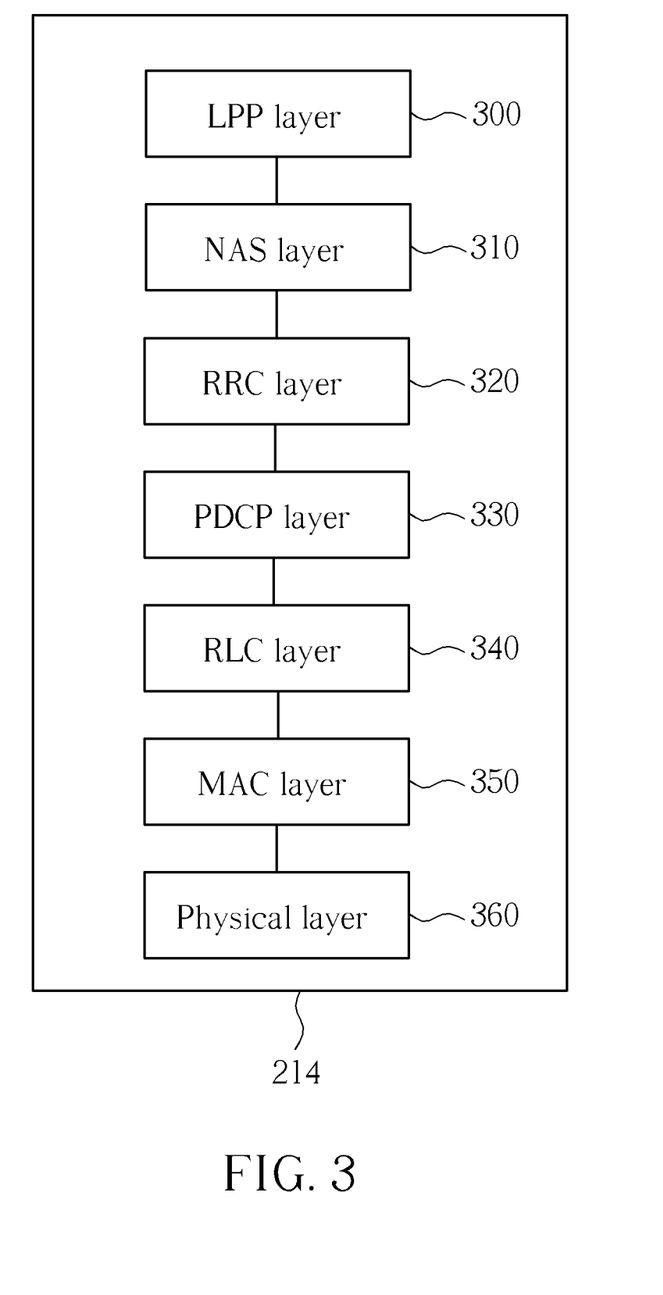
FIG. 3 illustrates a schematic diagram of exemplary program code.

Please refer to FIG. 3, which illustrates a schematic diagram of the program code 214 for the LTE system according to an example. The program code 214 includes program code of multiple communications protocol layers, which from top to bottom are a LTE positioning protocol (LPP) layer 300, a non-access stratum (NAS) layer 310, a radio resource control (RRC) layer 320, a packet data convergence protocol (PDCP) layer 330, a radio link control (RLC) layer 340, a medium access control (MAC) layer 350 and a physical (PHY) layer 360. The LPP layer 300 supports positioning and related location services for the UE accessing the E-UTRAN, and is intended to enable positioning functionality for LTE using a multiplicity of different position methods, e.g. a cell identity (ID) based method, an observed time difference of arrival (OTDOA) method, or a assisted Global Navigation Satellite System (A-GNSS) method.

Figure 4:
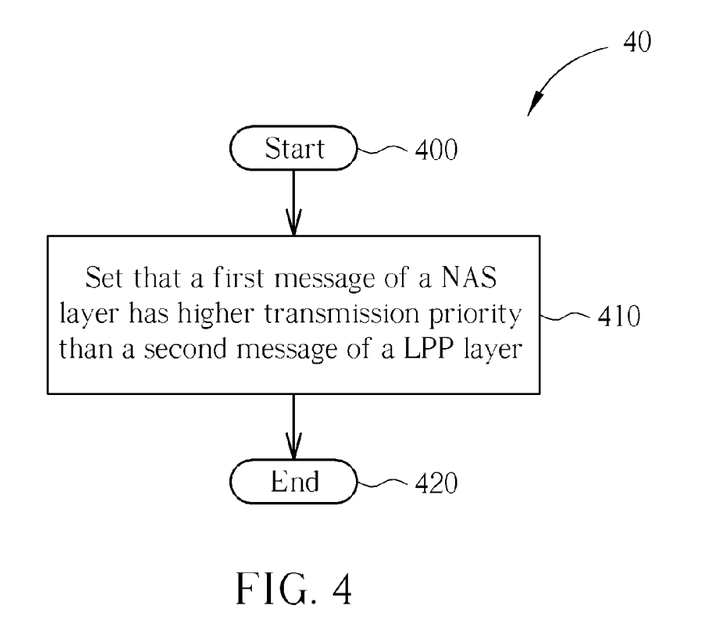
FIG. 4-8 are flowcharts of exemplary processes.

Please refer to FIG. 4, which illustrates a flowchart of an exemplary process 40. The process 40 is utilized in a communication device (e.g. the UE or the base station) for handling LPP data, where the UE can be the mobile device of FIG. 1. The process 40 may be compiled into the program code 214 and includes the following steps:

Step 400: Start.
Step 410: Set that a first message of a NAS layer has higher transmission priority than a second message of a LPP layer.
Step 420: End.

According to the process 40, when the UE has the LPP message and the NAS message to transmit, the UE transmits the NAS message first. That is, the UE sets the NAS messages as higher priority than the LPP PDU. The NAS message is usually used for service initiation (e.g. a mobile terminating call, or a mobile originating call), and shall be transmitted prior to the LPP message, thereby avoiding NAS message transmission postponement that causes service delay.

Ways for LPP PDU transmission are described as follows. In the first method, the UE transmits the LPP PDU and NAS message on signaling radio bearer 2 (SRB2). In the second method, the UE establishes a new SRB to transmit LPP PDU. The new SRB (e.g. SRB3) has a logical channel with lower priority than SRB2. More specifically, the UE RRC may receive a RRC message for configuring the SRB3 from a serving eNB RRC, and then establishes the SRB3 according to the RRC message. The RRC message may be an RRCConnectionSetup message or an RRCConnectionReconfiguration message. In the third method, the UE sends the NAS message on SRB1 and the LPP PDU on SRB 2, and the LPP PDU is forbidden to transmit on SRB1. Please note that, the SRB1 has higher logical channel priority than the SRB2, and a first transmission on the SRB1 has higher transmission priority than a second transmission on the SRB2. Logical channel prioritization shall be well-known in the art, so it is not given herein. In the fourth method, the UE transmits the LPP PDU and NAS message on the SRB1 if there is only SRB1 established (i.e. no SRB2).

Figure 5:
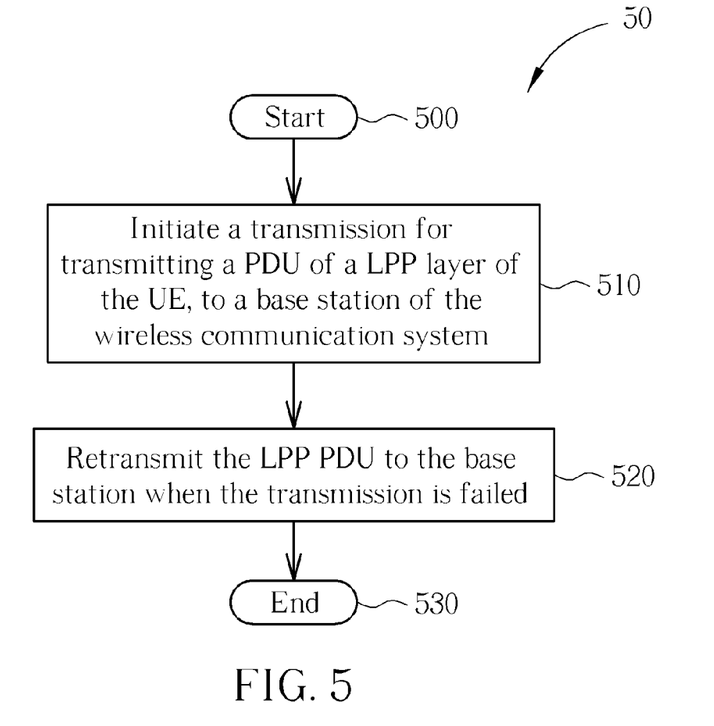

Please refer to FIG. 5, which illustrates a flowchart of an exemplary process 50. The process 50 is utilized in a UE for handling LPP data, where the UE can be the mobile device of FIG. 1. The process 50 may be compiled into the program code 214 and includes the following steps:

Step 500: Start.

Step 510: Initiate a transmission for transmitting a PDU of a LPP layer of the UE, to a base station of the wireless communication system.

Step 520: Retransmit the LPP PDU to the base station when the transmission is failed.

Step 530: End.

According to the process 50, when the UE does not transmit the LPP PDU successfully due to a re-establishment of a communication layer lower than the LPP layer, a handover procedure or a RRC connection re-establishment procedure (e.g. radio link failure), the UE retransmits the LPP PDU after the UE performs the re-establishment of the communication layer, the handover or the RRC connection re-establishment successfully. Please note that, the LPP PDU retransmission may be or not be exactly the same as the LPP PDU transmission.

Moreover, the re-establishment of the communication layer may be a RLC re-establishment or a PDCP re-establishment. In addition, the handover may be an intra-radio access technology (RAT) handover. That is, the handover is the intra-LTE handover since the LPP layer is developed in the LTE system. On the other hand, if the handover is an inter-RAT handover, the UE does not retransmit the LPP PDU unless the target RAT supports LPP. Furthermore, if the LPP PDU contains old measurement results, the UE does not retransmit the LPP PDU. For example, the UE is handover to another base station, but the LPP PDU contains measurement results associated with the original base station. In this situation, the UE shall not retransmit the LPP PDU to the connected base station after handover since the LPP PDU including old measurement results may not be valid.

Take an example based on the process 50. The UE may fail in transmitting the LPP PDU to the base station when the re-establishment of the communication layer lower than the LPP layer, the handover, or the RRC connection re-establishment of the mobile device occurs. The UE RRC retransmits the LPP PDU after the UE performs the re-establishment of the communication layer (e.g. the RLC layer or the PDCP layer), the handover or the RRC connection re-establishment successfully. Alternatively, the RRC layer may indicate to the LPP layer that the LPP PDU transmission is failed, and indicates to the LPP layer that the re-establishment of the communication layer, the handover, or the RRC connection re-establishment is performed successfully. After that, the LPP layer retransmits the LPP PDU when the RRC layer is indicated that the re-establishment of the communication layer, the handover, or the RRC connection re-establishment is performed successfully.

Or, the UE LPP starts a timer when transmitting the LPP PDU to the lower layer, retransmits the LPP PDU upon the timer expiry. If the UE RRC transmits the LPP PDU successfully, the UE RRC indicates to the UE LPP the LPP PDU transmission successes, and the UE LPP stops the timer. Besides the LPP layer and RRC layer are utilized to retransmit the LPP PDU, the UE PDCP retransmits the LPP PDU after the UE performs the re-establishment of the communication layer, the handover, or the RRC connection re-establishment successfully.

Please note that, the UE may transmit or retransmit the LPP PDU to the base station on a SRB other than SRB1 and SRB2. Establishment for the SRB can be referred from above, so it is not given herein.

Based on the process 50, the UE knows how to deal with failure of LPP PDU transmission due to the lower layer re-establishment, the handover, or the RRC connection re-establishment, thereby avoiding LPP PDU loss.

Figure 6:
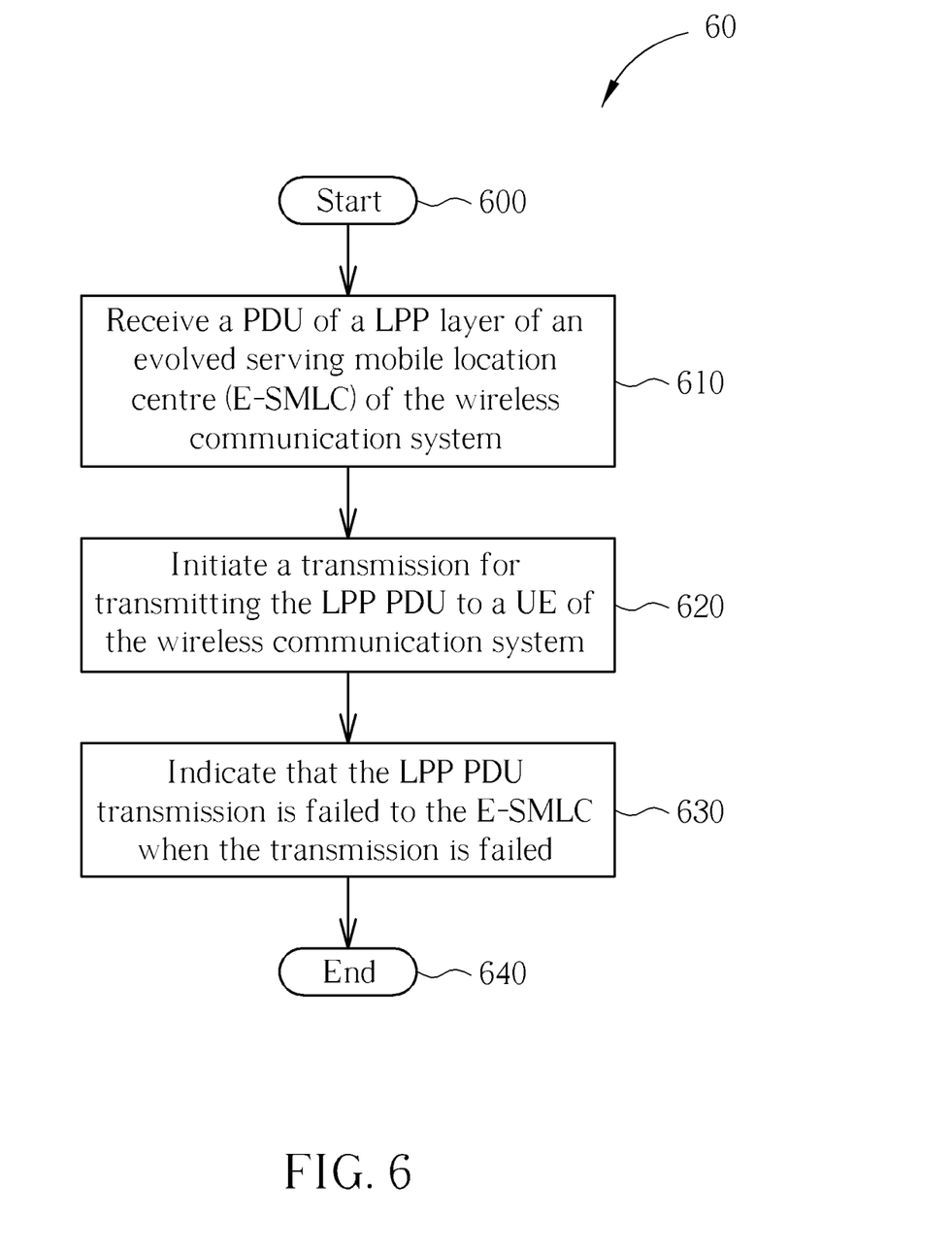

Please refer to FIG. 6, which illustrates a flowchart of an exemplary process 60. The process 60 is utilized in a network for handling LPP data. The process 60 may be compiled into the program code 214 and includes the following steps:

Step 600: Start.

Step 610: Receive a PDU of a LPP layer of an evolved serving mobile location centre (E-SMLC) of the wireless communication system.

Step 620: Initiate a transmission for transmitting the LPP PDU to a UE of the wireless communication system.

Step 630: Indicate that the LPP PDU transmission is failed to the E-SMLC when the transmission is failed.

Step 640: End.

According to the process 60, the network may fail in transmitting the LPP PDU received from the E-SMLC, to the UE when the re-establishment of the communication layer lower than the LPP layer, the handover, or the RRC connection re-establishment (e.g. the network cannot detect the UE) of the UE occurs. Therefore, the network indicates that the LPP PDU transmission is failed to the E-SMLC. Thus, the E-SMLC can determine whether to retransmit the LPP PDU or not.

Please note that, the handover may be an intra-LTE handover. Moreover, if the UE reconnects to a first base station of the network after the handover or the RRC connection re-establishment procedure (namely the UE is not handover or connected to other base station), the first base station does not indicate to the E-SMLC that the LPP PDU transmission failed, but retransmits the LPP PDU to the UE after the UE performs the re-establishment of the communication layer lower than the LPP layer, the handover, or the RRC connection re-establishment successfully. In addition, the first base station may utilize the PDCP layer of the first base station to retransmit the LPP PDU to the UE after the UE performs the re-establishment of the communication layer lower than the LPP layer, the handover, or the RRC connection re-establishment successfully.

On the other hand, if the UE connects to a second base station of the network after the handover or the RRC connection re-establishment procedure, the first base station forwards the LPP PDU to the second base station, so that the second base station retransmits the LPP PDU to the UE after the UE performs the re-establishment of the communication layer lower than the LPP layer, the handover, or the RRC connection re-establishment successfully.

Figure 7:
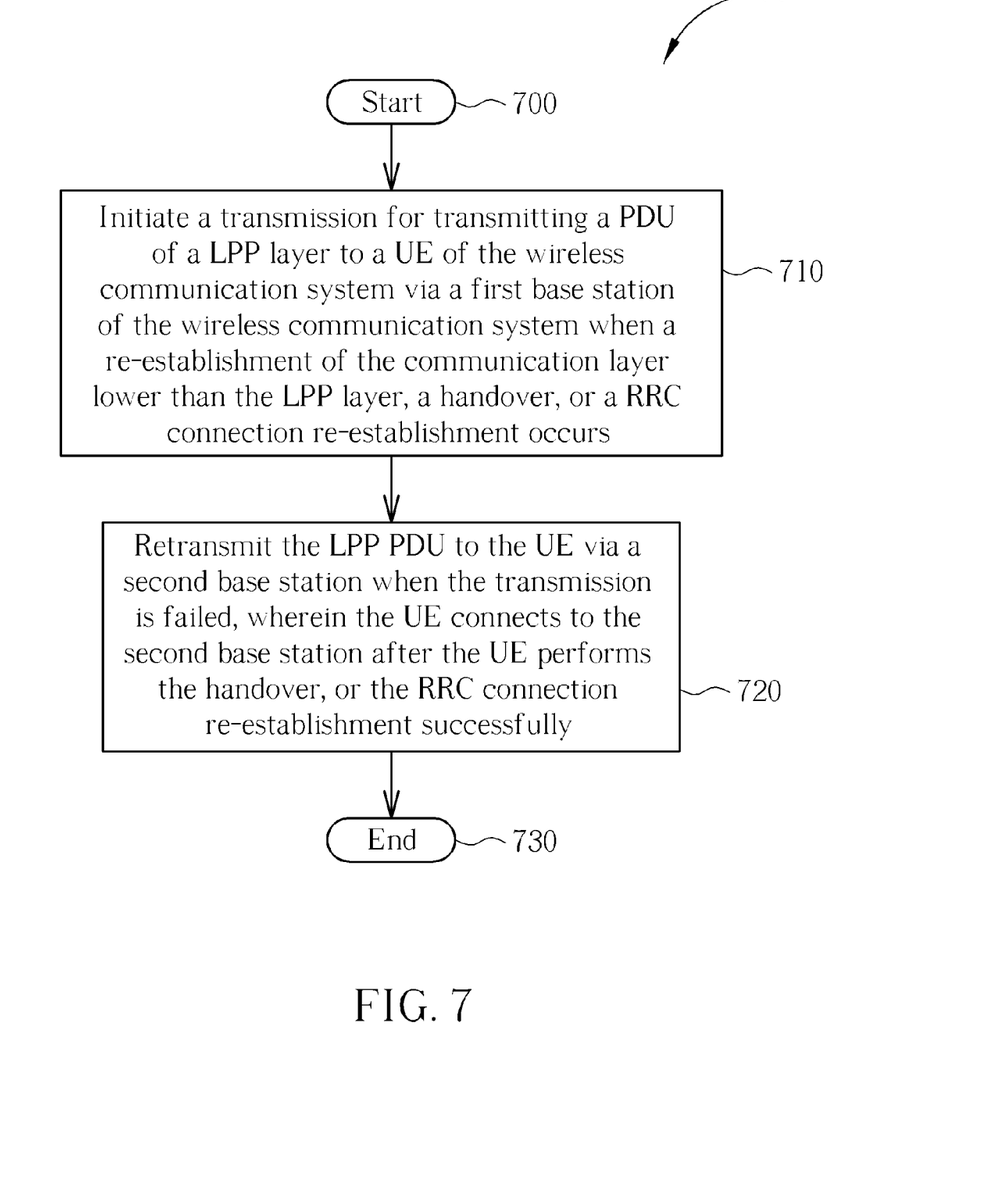

Please refer to FIG. 7, which illustrates a flowchart of an exemplary process 70. The process 70 is utilized in an E-SMLC for handling LPP data. The process 70 may be compiled into the program code 214 and includes the following steps:

Step 700: Start.

Step 710: Initiate a transmission for transmitting a PDU of a LPP layer to a UE of the wireless communication system via a first base station of the wireless communication system when a re-establishment of the communication layer lower than the LPP layer, a handover, or a RRC connection re-establishment occurs.

Step 720: Retransmit the LPP PDU to the UE via a second base station when the transmission is failed, wherein the UE connects to the second base station after the UE performs the handover or the RRC connection re-establishment successfully.

Step 730: End.

According to the process 70, the E-SMLC transmits the LPP PDU to the UE via the first base station. If the first base station does not transmit the LPP PDU successfully due to the re-establishment of the communication layer lower than the LPP layer, the handover procedure or the RRC connection re-establishment procedure, the E-SMLC retransmits the LPP PDU to the UE via the second base station to which the UE connects after the handover, or the RRC connection re-establishment, thereby avoiding LPP PDU loss. Please note that, the first base station be may the same as the second base station if the UE is handover to the first base station, or the UE performs the RRC connection re-establishment to the first base station.

The abovementioned handover is an intra-RAT handover (e.g. intra-RAT handover). On the other hand, if the handover is an inter-RAT handover and the target RAT does not support LPP, the E-SMLC does not retransmit the LPP PDU to the UE.

Figure 8:
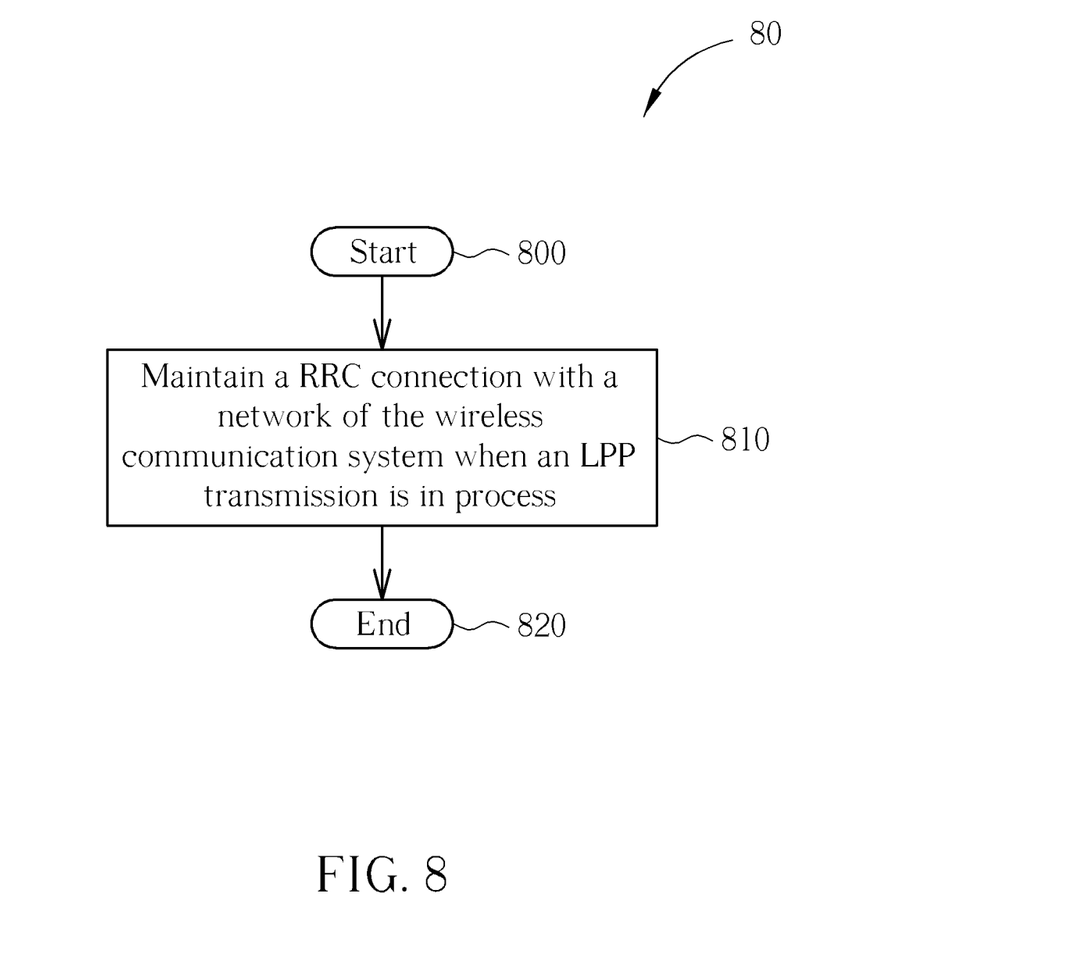

Please refer to FIG. 8, which illustrates a flowchart of an exemplary process 80. The process 80 is utilized in a UE for handling LPP data, where the UE can be the mobile device of FIG. 1. The process 80 may be compiled into the program code 214 and includes the following steps:

Step 800: Start.

Step 810: Maintain a RRC connection with a network of the wireless communication system when an LPP transmission is in process.

Step 820: End.

According to the process 80, the UE maintains the established RRC connection when the LPP transmission is in process. For example, when the LPP transmission is ongoing, the UE keeps the established RRC connection even though a timer T3440 for releasing the RRC connection or a NAS signaling connection expires. In other words, the UE does not release the RRC connection when the LPP transmission is in process, thereby avoiding the LPP transmission failure.

One way to maintain the established RRC connection during running of the timer T3440 is described as following. The UE may keep the established RRC connection via stopping the timer T3440 when the LPP transmission is ongoing. Therefore, the UE does not release the RRC connection, so as to continue the LPP transmission.

Alternatively, before starting the timer T3440, the UE may check whether the LPP transmission is in process. If no LPP transmission is in process, the UE starts the timer T3440. Otherwise, the UE does not start the timer T3440.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary method and means are provided to handle the LPP PDU with the transmission priority, and transmission failure aspect.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of handling long term evaluation positioning protocol (LPP) data for a communication device in a wireless communication system, the method comprising:
setting that a first message of a non-access stratum (NAS) layer has higher transmission priority than a second message of a long term evaluation positioning protocol (LPP) layer to transmit the first message of the NAS layer first; and
establishing a signaling radio bearer (SRB) which has lower logical channel priority than a signaling radio bearer 2 (SRB2), and then transmitting the second message on the SRB;
wherein the step of establishing the SRB which has lower logical channel priority than the SRB2 comprises:
receiving a radio resource control (RRC) message for the SRB configuration from a network of the wireless communication system when the communication device is a mobile device; and
establishing the SRB according to the received RRC message;
wherein the first message of the NAS layer does not comprise any LPP protocol data unit (PDU).

2. A communication device of a wireless communication system for handling long term evaluation positioning protocol (LPP) data, the communication device comprising:
means for generating a first message of a non-access stratum (NAS) layer of the communication device and a second message of a long term evaluation positioning protocol (LPP) layer of the communication device;
means for setting that the first message of the NAS layer has higher transmission priority than the second message of the LPP layer to transmit the first message of the NAS layer first; and
means for establishing a signaling radio bearer (SRB) which has lower logical channel priority than a signaling radio bearer 2 (SRB2), and then transmitting the second message on the SRB;
wherein the means for establishing the SRB which has lower logical channel priority than the SRB2 comprises:
means for receiving a radio resource control (RRC) message for the SRB configuration from a network of the wireless communication system when the communication device is a mobile device; and
means for establishing the SRB according to the received RRC message;
wherein the first message of the NAS layer does not comprise any LPP protocol data unit (PDU).

* * * * *